United States Patent
Naypaver

(10) Patent No.: US 7,347,511 B1
(45) Date of Patent: Mar. 25, 2008

(54) ROTARY WALKER ROBOTIC PLATFORM

(76) Inventor: Frank Ronald Naypaver, 351 Florine Ave., Leavittsburg, OH (US) 44430

( * ) Notice: Subject to any disclaimer, the term of this patent is extended or adjusted under 35 U.S.C. 154(b) by 316 days.

(21) Appl. No.: 11/061,265

(22) Filed: Feb. 17, 2005

(51) Int. Cl.
*B62D 57/02* (2006.01)

(52) U.S. Cl. .............................. 305/1; 301/52; 305/60; 180/8.3

(58) Field of Classification Search .................... 305/1, 305/2, 3, 4, 60; 301/5.1, 52, 1; 180/8.3, 180/8.7
See application file for complete search history.

(56) References Cited

U.S. PATENT DOCUMENTS

| 1,396,194 | A | * | 11/1921 | Gould ............................. 305/1 |
| 1,422,952 | A | * | 7/1922 | Feuillette ...................... 301/50 |
| 1,840,779 | A | * | 1/1932 | Johnston ....................... 305/19 |
| 2,786,540 | A | * | 3/1957 | Sfredda .................... 180/24.08 |
| 5,685,383 | A | | 11/1997 | Ferrante |
| 6,068,073 | A | | 5/2000 | Roston et al. |
| 6,463,356 | B1 | | 10/2002 | Hattori et al. |
| 6,832,132 | B2 | | 12/2004 | Ishida et al. |

\* cited by examiner

*Primary Examiner*—Russell D. Stormer
*Assistant Examiner*—Kip Kotter
(74) *Attorney, Agent, or Firm*—Harpman & Harpman

(57) ABSTRACT

A rotary walking device having multiple sequential ground engaging elongated struts interconnected between pairs of annular drive disks. Each pair of drive disks having multiple pivot attachment points for the respective opposing apertured ends of each strut. Each strut having angularly offset parallel engagement ends which engage with spaced co-parallel drive disks affording a unique rotational linear travel path that allows each of the struts to sequentially engage the ground and propel the assembly forward in a progressive walking like motion when used in combination with corresponding second strut drive assembly.

5 Claims, 6 Drawing Sheets

ROTARY WALKER ROBOTIC PLATFORM

BACKGROUND OF THE INVENTION

1. Field of the Invention

This invention relates to robots, specifically ones to provide useful aid to humans by performing household or industrial tasks. Such robots are limited by their use of wheels and/or tracks, which restricts their usefulness. A variety of alternate propulsion designs have been developed with limited practical success due to the complexity and cost. The goal of these devices is to deliver a simple and cost effective efficient propulsion system which will emulate a walking motion which is important for different terrain situations having unstable surfaces and the ability to climb inclines, walls or steps which usually defeats track or wheeled vehicles to a certain extent.

2. Description of Prior Art

As noted, a number of prior art robot propulsion systems have been developed with most utilizing a wheeled or modified track system as well as some bipedal and multiple leg configurations, see for example U.S. Pat. Nos. 6,832,132, 5440,916, 5,685,383, 6,068,073, and 6,463,356.

SUMMARY OF THE INVENTION

A rotary walking system for robots that will provide for transportation over a wide variety of terrain surfaces. The rotary walking system utilizes multiple ground engagement strut elements driven between pairs of rotary drive structures. Each of the multiple strut assemblies utilize sequential positioning of struts for ground engagement in an endless pedable loop configuration when used in pairs which then propels the assembly forward. The rotary drive structures are in longitudinally spaced parallel relation to one another in angular offset orientation to the longitudinal axis of the struts which have oppositely disposed co-lateral angularly offset apertured end mounting portions. This arrangement affords the strut clearance to one another as they are rotated about on the rotary drive structures and sequentially positioned for their longitudinal surface engagement with the surface terrain.

DETAILED DESCRIPTION OF THE INVENTION

Figure 1:
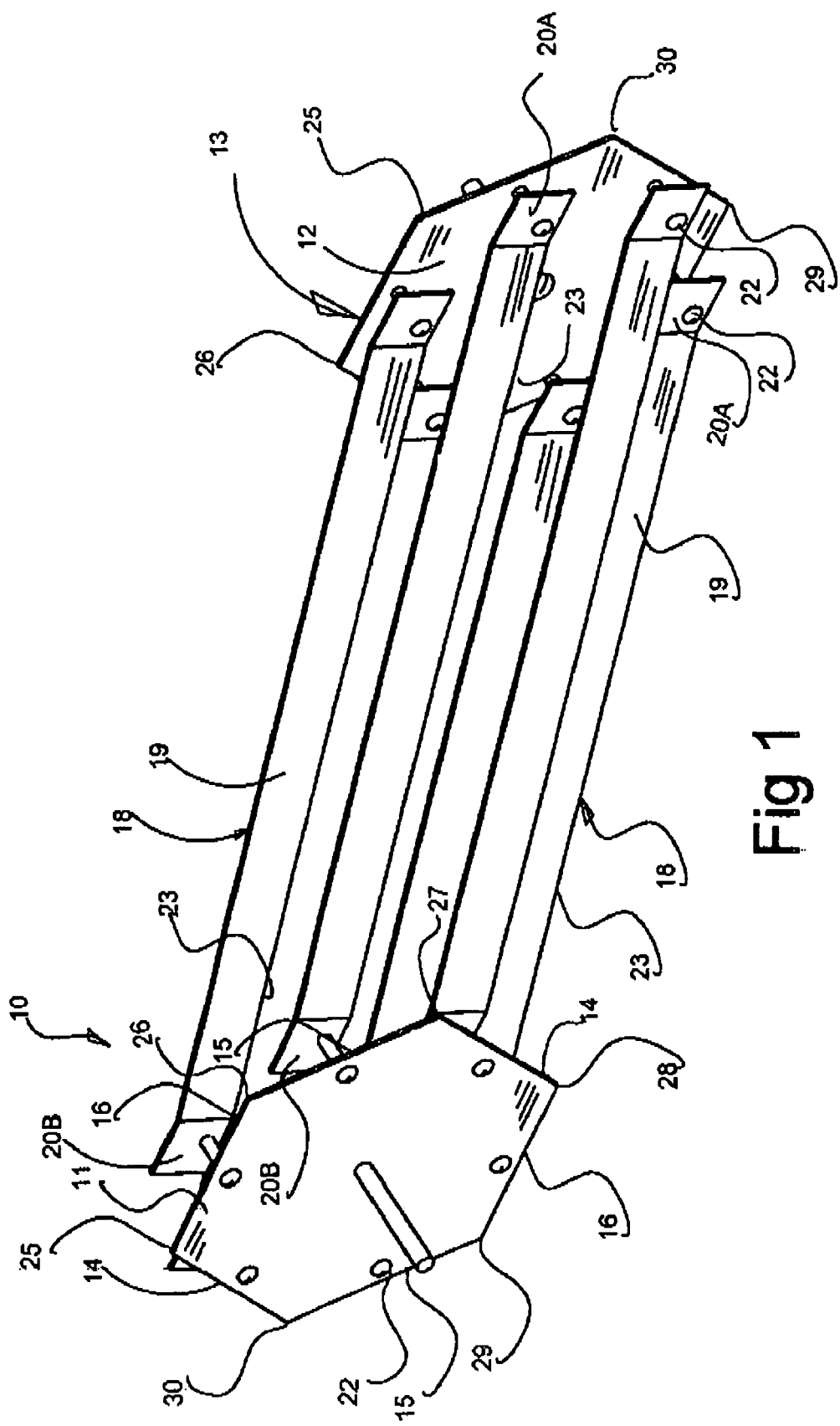
FIG. 1 is a perspective view of the walking assembly of the invention.
Figure 2:
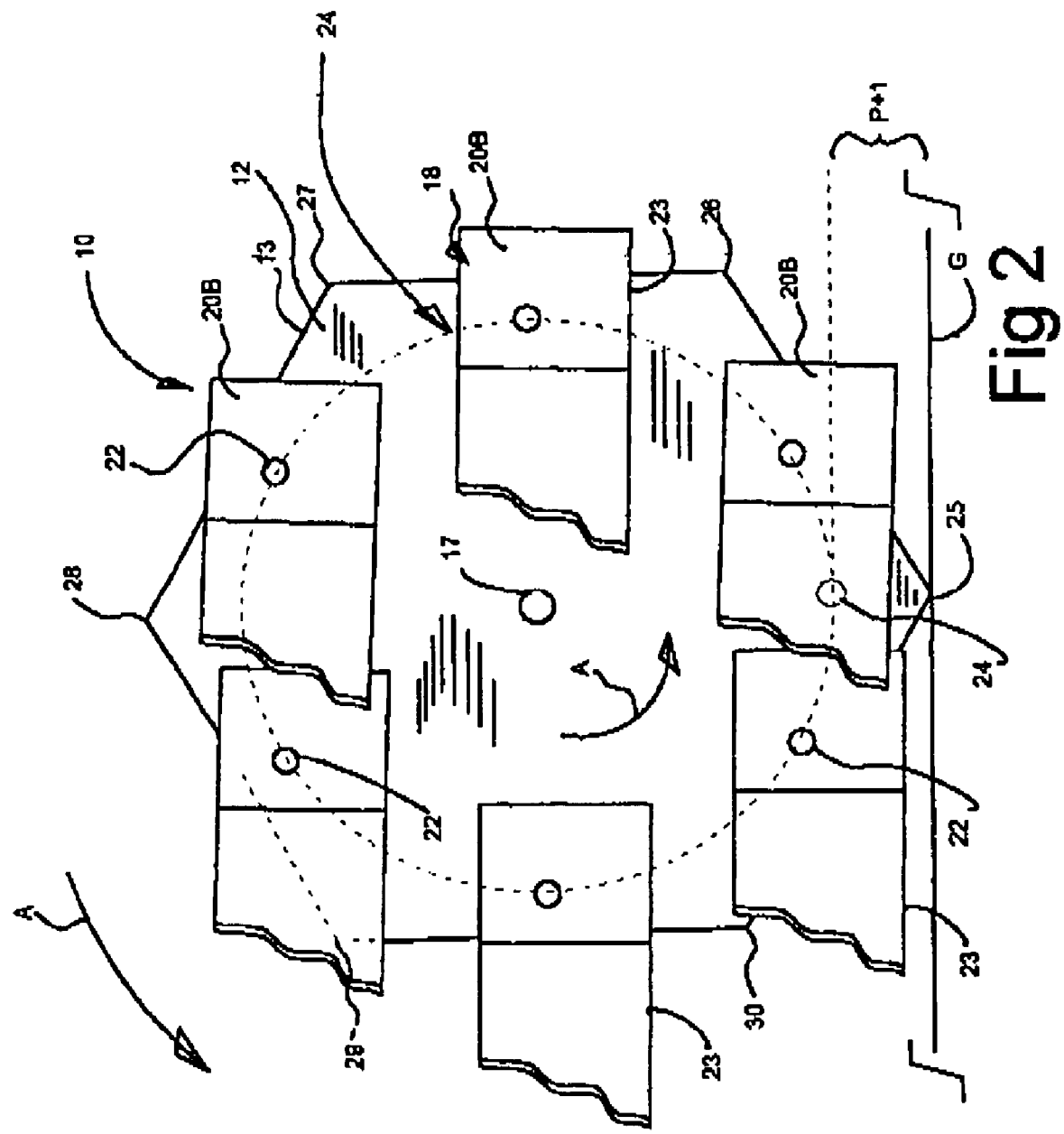
FIG. 2 is a graphic elevational view illustrating strut placement on rotary drive elements during use.
Figure 3:
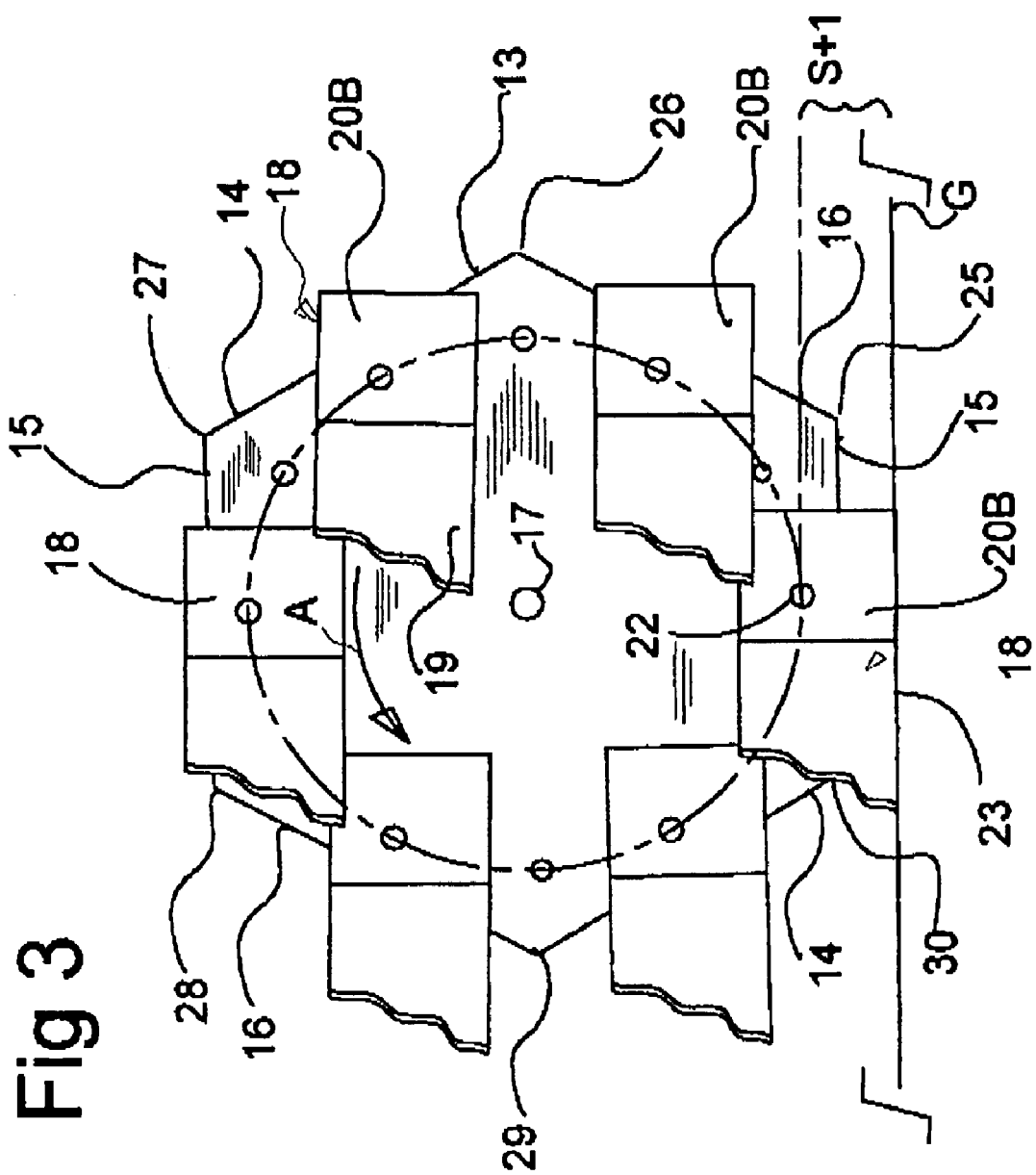
FIG. 3 is a graphic elevational view of the strut placement on the rotary drive elements during strut contact with a surface.

Referring now to FIGS. 1-3 of the drawings, a walking assembly 10 of the invention can be seen having a pair of drive wheel and support disks 11 and 12 having a plurality of perimeter edge surfaces 13 which are of equal longitudinal dimension arranged in co-parallel oppositely disposed spaced pairs 14, 15 and 16 about a central axis 17 as best seen in FIG. 2 of the drawings.

Figure 4:
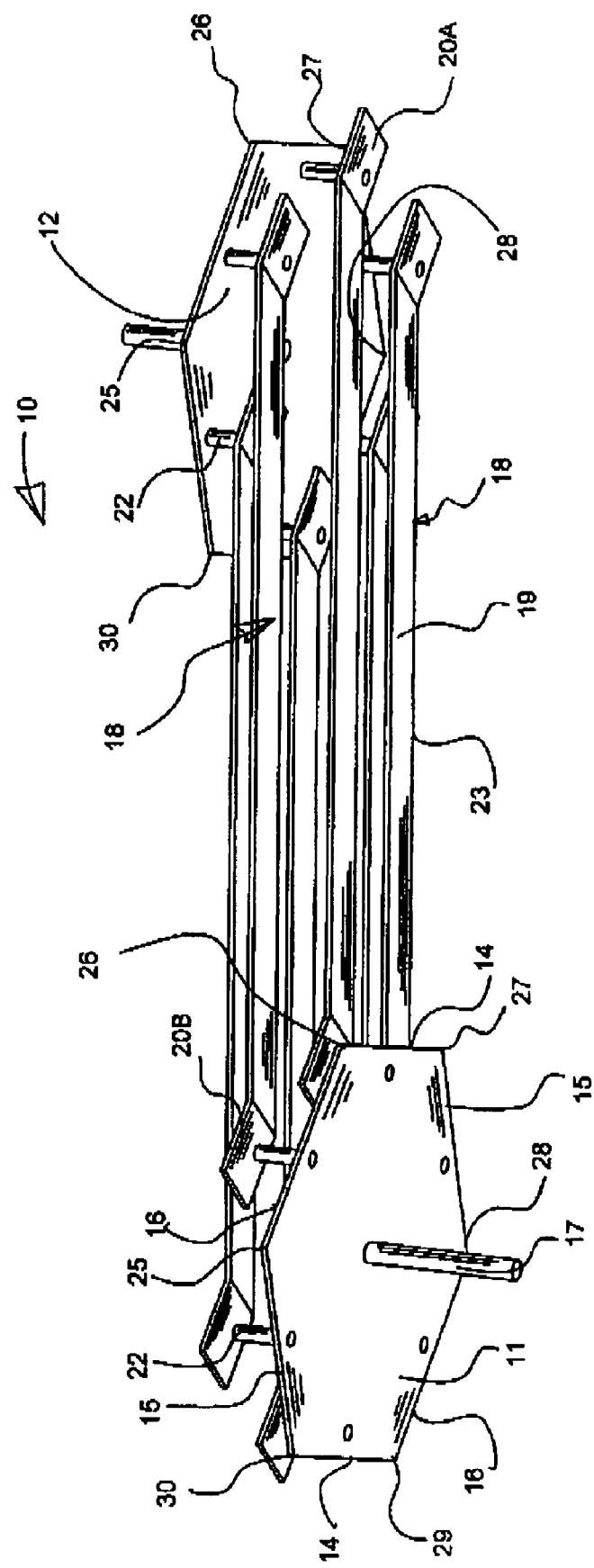
FIG. 4 is an alternate perspective view of the walking assembly.
Figure 5:
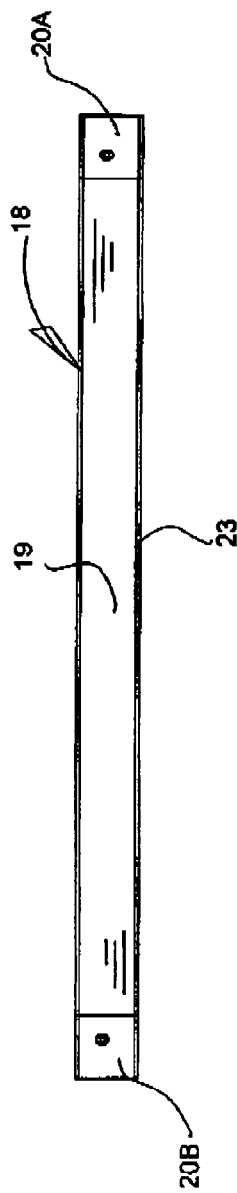
FIG. 5 is a side elevational view of a single strut element.
Figure 6:
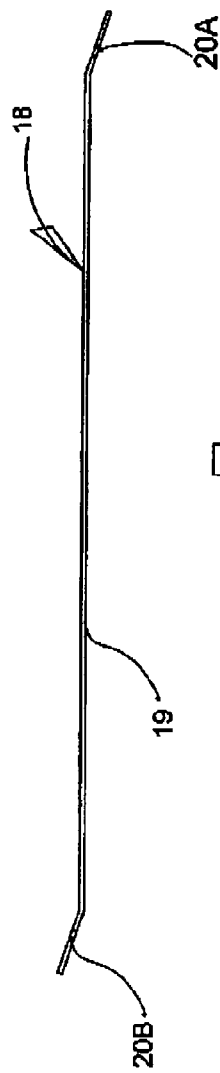
FIG. 6 is a top plan view of the strut element shown in FIG. 5.

Multiple elongated ground engagement struts 18 are defined as having a main flat body member 19 with oppositely disposed angularly offset end attachment portions 20A and 20B as best seen in FIGS. 5 and 6 of the drawings. The struts 18 are pivotally secured by apertures in their respective attachment portions 20A and 20B to pivot mounting pins 22 spaced radially about the drive wheel and support disks 11 and 12 interconnecting same as seen in FIGS. 1 and 4 of the drawings.

The positioning of the respective pivot mounting pins 22 on the drive wheel and support disks 11 and 12 of the walking assembly 10 is critical. Each strut attachment point defined by the pivot mounting pins 22 is evenly spaced annularly on the drive disk wheels with the effective distance therebetween defined in relation with the transverse dimension of the strut 18 and associated mounting position thereon.

This is best illustrated in combination with their attached struts 18 which have a transverse dimension that when so attached the distance between the pivot attachment point the struts 18 respective longitudinal ground engagement edges 23 in operable alignment illustrated as S+1 in FIG. 3 of the drawings is the same as that of the pivot attachment point projected annularly as shown in broken lines at 24 to corresponding junction of respective abutting edge surfaces 13 at 25-30 on said respective drive wheel and support disks 11 and 12 illustrated as P+1 in FIG. 2 of the drawings.

Referring to FIGS. 1, 2 and 3 of the drawings, the struts 18 and the drive wheel and support disks 11 and 12 orientation during use is illustrated wherein in FIG. 3 of the drawings a strut 18 is in ground G engagement with the disk 12 in this example elevated thereabove. As the disk rotation occurs, as noted by the directional arrow A, the disk 12, as now seen in FIG. 2 of the drawings, ground engagement points 25-30 as hereinbefore described with the engagement point 25 in full ground G engagement. This is a critical feature of the functionality of the invention which by minimizing the effective "drop" distance of each disk 11 and 12 from strut ground engagement to disk junction edge engagement provides a smooth transition which is achieved during operation.

Figure 7:
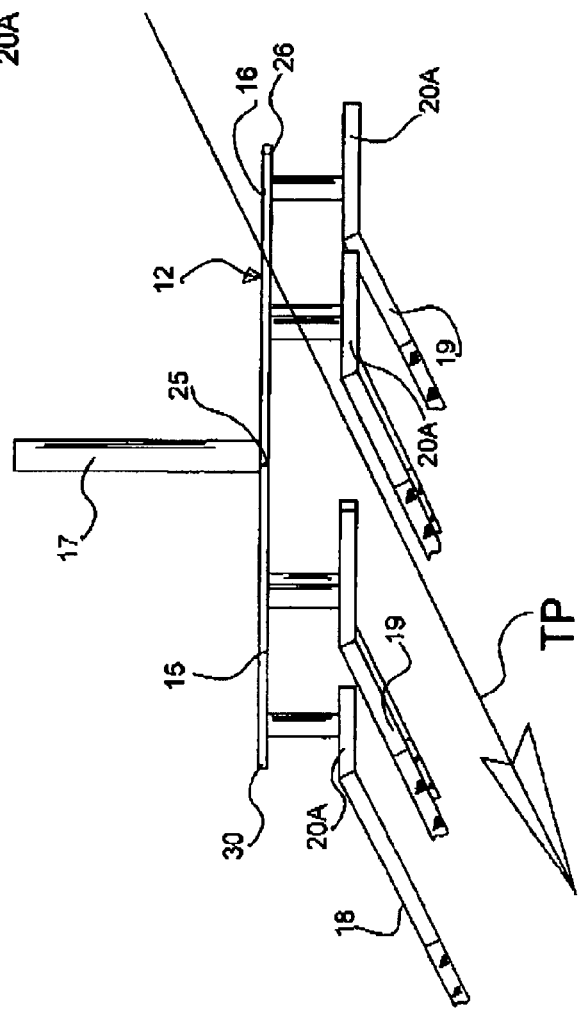
FIG. 7 is a graphic top plan view of a portion of the walking assembly of the invention with strut portions broken away.

It will be seen that the struts 18 oppositely disposed angular offset aperture end attachment portions 20A and 20B provide for corresponding parallel angular alignment of the disks 11 and 12 in respect to the longitudinal axis of the struts as best seen in FIG. 7 of the drawings with the direction of travel path illustrated by arrow TP.

This angular orientation of the disks allows for multiple so attached struts 18 to rotate about the disks freely. Referring now to FIG. 4 of the drawings, the effective front struts 18[A] will move up around and behind the central axis 17 missing the corresponding intervening pivot mounting pins on each of the ends of the associated respective struts 18 allowing the drive wheel and support disks 11 and 12 to turn freely with the struts 18 so attached. It is also evident that by the defined travel path loop of the struts 18 thereabout as the drive wheel and support disks 11 and 12 rotate, the struts 18 will move up and over and down sequentially engaging and disengaging the ground G thereby affording a forward propulsion to the walking assembly 10 along the surface of the ground G.

It is the angular inclination of the disks 11 and 12 on a linear axis of the struts and their respective opposing angular disposition attachment portions 20A and 20B that provide workability of the device as hereinbefore described.

Figure 8:
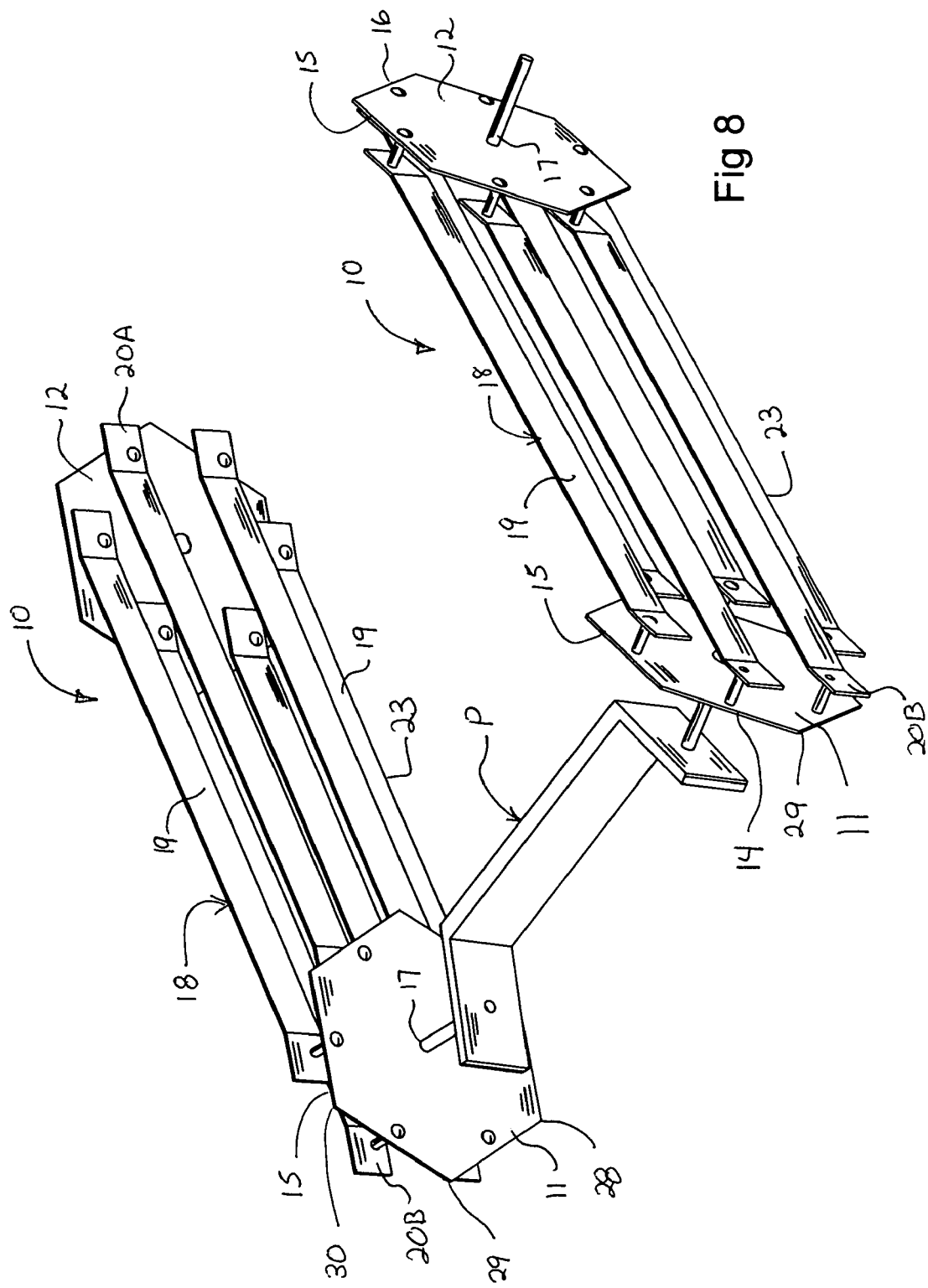
FIG. 8 is a perspective view of interconnected multiple walking assemblies.

Referring to FIG. 8 of the drawings, it will be seen that by using a pair of walking assemblies 10, a support drive assembly for a mobile platform P so equipped with drive means for at least one of the respective disks 11 and 12 on each so configured platform assembly that a true walking functionality can be emulated by the so configured walking assemblies 10 of the invention within the robotic art.

It will thus be seen that a new and novel walking assembly has been illustrated and described and it will be evident to those skilled in the art that various changes and modifications may be made thereto without departing from the spirit of the invention.

Therefore I claim:

1. An all terrain walking assembly for robotic platforms comprises,
   - a plurality of elongated ground engagement struts having oppositely disposed angularly offset apertured end attachment portions pivotally secured between drive wheel and support disks, said ground engagement struts in aligned orientation to the directionality of the travel path,
   - each said apertured end attachment portion having an annularly spaced strut pivot pin extending therefrom to a perimeter edge of a respective one of said drive and support disks
   - said drive and support disks having multiple annularly spaced ground engagement points thereon between respective strut engagement pins and multiple pairs of spaced opposing parallel perimeter edge surfaces in non-contact relation to said ground surface.

2. The walking assembly set forth in claim 1 wherein said angular offset attachment portions extend from opposing surfaces of said struts.

3. The walking assembly set forth in claim 1 wherein said struts are pivotally secured from oppositely disposed surfaces of said respective drive and support disks.

4. The walking assembly set forth in claim 1 wherein said drive and support disks are in angularly spaced co-parallel relation to one another in angular offset relation to the directionality of the travel path.

5. The walking assembly set forth in claim 1 wherein said drive and support disks are in spaced angularly disposed relation to the longitudinal axis of said respective interconnecting struts.

* * * * *